United States Patent [19]
Huang

[11] Patent Number: 5,481,540
[45] Date of Patent: Jan. 2, 1996

[54] FDDI BRIDGE FRAME LEARNING AND FILTERING APPARATUS AND METHOD

[75] Inventor: Gang Huang, Middletown, N.J.

[73] Assignee: AT&T Corp., Murray Hill, N.J.

[21] Appl. No.: 336,887

[22] Filed: Nov. 10, 1994

Related U.S. Application Data

[63] Continuation of Ser. No. 572,738, Aug. 24, 1990, abandoned.

[51] Int. Cl.⁶ .............................. H04J 3/02; H04L 12/28
[52] U.S. Cl. .......................................... 370/85.13
[58] Field of Search .............................. 370/85.13, 85.1, 370/85.9, 85.12, 85.15, 85.4, 94.1, 60, 85.5; 340/825.05, 825.5, 825.51

[56] References Cited

U.S. PATENT DOCUMENTS

| | | | |
|---|---|---|---|
| 4,597,078 | 6/1986 | Kempf | 370/94.1 |
| 4,627,052 | 12/1986 | Hoare et al. | 370/85.13 |
| 4,707,827 | 11/1987 | Bione et al. | 370/94.1 |
| 4,860,284 | 8/1984 | Brown et al. | 370/85.15 |
| 4,914,653 | 4/1990 | Bishop et al. | 370/85.6 |
| 4,922,503 | 5/1990 | Leone | 370/85.13 |
| 4,942,571 | 7/1990 | Moller et al. | 370/85.13 |
| 4,972,409 | 11/1990 | Backes | 370/85.13 |
| 5,046,065 | 9/1991 | Goertz | 370/85.13 |
| 5,058,109 | 10/1991 | Goldberg et al. | 370/94.1 |
| 5,136,580 | 8/1992 | Videlock et al. | 370/94.1 |
| 5,151,897 | 9/1992 | Suzuki | 370/85.14 |

*Primary Examiner*—Benedict V. Safourek
*Assistant Examiner*—Dang Ton
*Attorney, Agent, or Firm*—Barry H. Freedman; Gregory C. Ranieri

[57] ABSTRACT

A bridge connected to an FDDI network preprocesses messages each comprising source address (SA), destination address (DA) and data, using a data base of SA's maintained in a content addressable memory (CAM). A finite state machine working with the other elements of the FDDI bridge acts as an intelligent controller, to select which messages are to be passed to a buffer memory for further processing and ultimate transmission to a remote network. Messages are only passed to the buffer memory if the DA is different from the SA's stored in the CAM. Circuitry is advantageously provided not only to "teach" the CAM about SA's on the network, but also to monitor information relating to the the last activity in a station associated with a particular SA, so that "stale" SA's can be purged from the CAM.

25 Claims, 4 Drawing Sheets

FDDI BRIDGE FRAME LEARNING AND FILTERING APPARATUS AND METHOD

This application is a continuation of application Ser. No. 07/572,738, filed on Aug. 24, 1990, now abandoned.

TECHNICAL FIELD

This invention relates generally to fiber distributed data interface (FDDI) bridges, and, in particular, to frame learning and filtering in a transparent bridge that works with FDDI frame transmit/receive apparatus to decide whether or not to receive a frame, and thereafter to further process the frame so as to, for example, transmit on an interconnected network.

BACKGROUND OF THE INVENTION

In prior art local area networks, such as the Ethernet system, frames or messages transmitted on a transmission medium interconnecting a plurality of transmitter/receiver stations include source address (SA) and destination address (DA) information as well as data. Also connected to the medium are bridges to destinations outside of the first network, for example stations on an interconnected second network.

When a message is received at a first port in a bridge, it is filtered to decide whether that frame should be forwarded to another port in the bridge for transmission onto the second network. How quickly such a decision can be made largely determines the performance of the bridge. Filtering in a transparent bridge generally involves two different activities. First, a data base of the addresses of the active stations on the local network must be established and maintained. This is done by "learning", i.e., collecting the source addresses of all frames traveling on the network in the data base. Second, for every frame arriving at the bridge, the data base is searched to determine whether the destination address of the arrival frame matches any entries in the data base. If a match exists, it is concluded that the frame is destined for a station on the local network where the port is connected. In this event, the frame needs no further processing in the bridge. On the other hand, if there is no match, then the destination is assumed to be a station on a different network, in which case the frame may be further processed and founded to a second port in the bridge for transmission onto the second network.

In prior art filter implementations in transparent bridges, the above procedures are performed mostly by software. A port usually receives all frames, regardless of their destination address and passes them into a buffer memory, while a processor examines every frame in the buffer memory and uses the source and destination address information to determine if the frame is to be output, and to build up and update the SA data base. As long as information transmission speeds on the network are relatively slow, (e.g., below 10 Mbs and less than 20 Kf/s) the filtering process just described can adequately be implemented in software. However, in the FDDI environment described in the ANSI X3T9.5 document, where speeds of 100 Mbs and a maximum frame rate of greater than 500 K f/s may occur, this approach is not acceptable. This is because the time necessary to process every message (in order to identify the fraction of messages that are bound for external networks) could far exceed the time interval at which successive messages are presented to the bridge from the network, resulting in the overflowing of the memory and/or overloading of the processor.

SUMMARY OF THE INVENTION

In accordance with the present invention, a bridge connected to an FDDI network preprocesses messages using a hardware based arrangement in which the SA data base is maintained in a content addressable memory (CAM). A finite state machine working with the other elements of the FDDI bridge acts as an intelligent controller to select which messages are to be passed to the buffer memory for further processing and ultimate transmission to a station on a remote network. Messages are only passed to the buffer memory if the DA is different from the SA's stored in the CAM, indicating that the message is to be forwarded through the bridge to the second network.

Circuitry is advantageously provided not only to "teach" the CAM about SA's on the network, but also to monitor information relating to the the last activity in a station associated with a particular SA, so that "stale" SA's can be purged from the CAM.

Since the present invention includes a hardware based preprocessor and operates in real time, only a fraction of messages destined for stations remote from the local network are presented to the buffer memory for processing, preventing memory overflow and processor overload. Indeed, it has been found that an order of magnitude improvement in processing efficiency can be obtained, as compared to traditional software learning/filtering apparatus and methods.

BRIEF DESCRIPTION OF THE DRAWING

The present invention will be better appreciated by consideration of the following Detailed Description, when read in light of the accompanying drawing in which.

DETAILED DESCRIPTION

Figure 1:
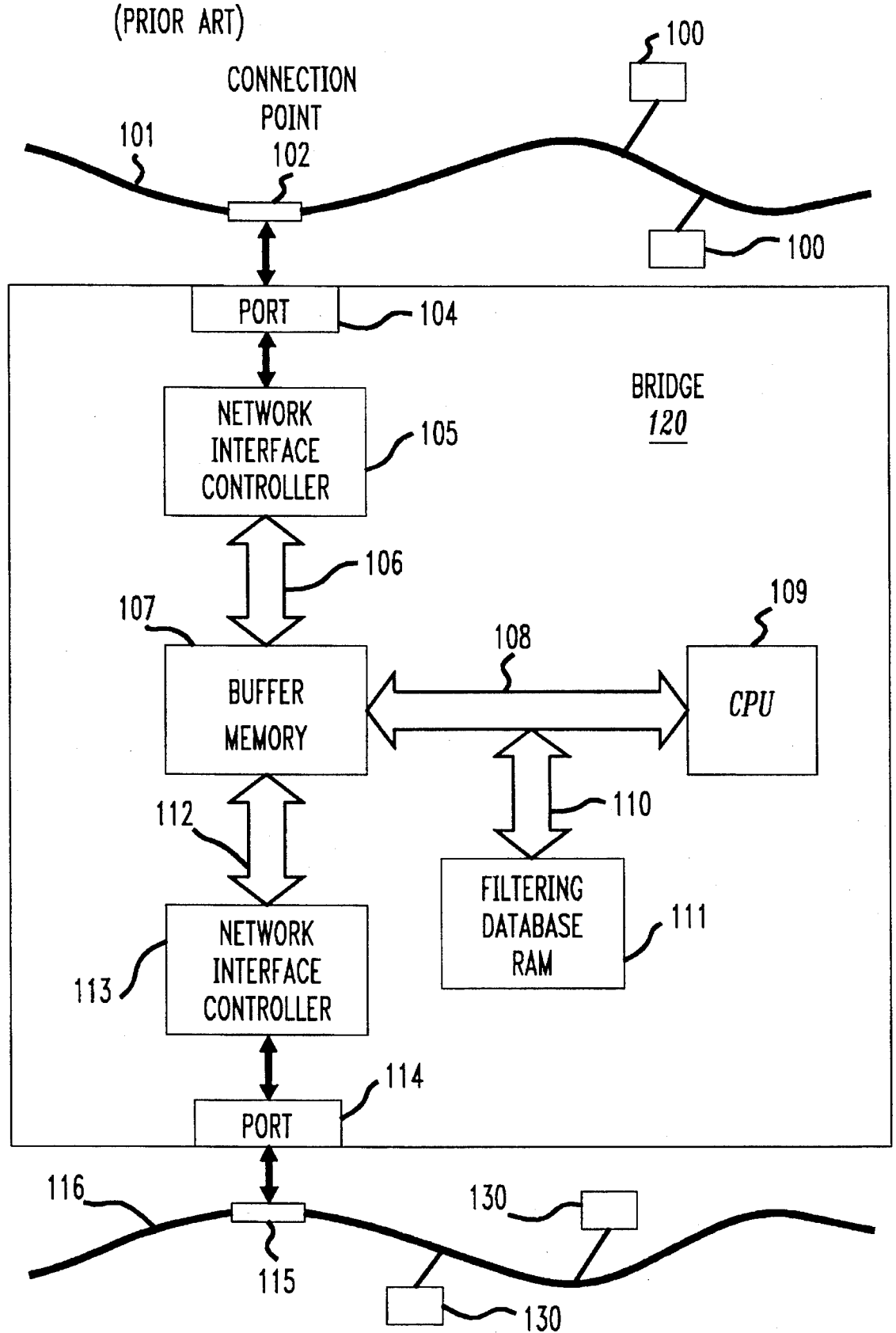
FIG. 1 is a block diagram of an example of a prior art bridge interconnecting first and second local area networks.

Referring first to FIG. 1, there is shown an overall block diagram illustrating a bridge arrangement of a type used generally in the prior an with respect to local area networks such as Ethernet. In FIG. 1, a communication network supporting packet communications at speeds of about 10 Mbs consists of a series of stations 100 interconnected by a communications medium 101. Also connected to medium 101 at connection point 102 is a bridge designated generally as 120. Other bridges and stations connected to medium 101 each have an assigned destination address (DA) and source address (SA). A general description of the arrangement of stations and the formats for messages can be found in U.S. Pat. No. 4,597,078 issued to M. F. Kempf on Jun. 24, 1986, and in IEEE 802.3 specification document.

Messages received in bridge 120 via port 104 are input to a network interface controller 105, which passes data in each received packet, as well as the associated SA and DA, to a buffer memory 107. In order to determine if the message should be forwarded to a second network of stations 130 connected to communications medium 116, the DA is passed to a processor (CPU) 109 via pathway 108. A lookup operation can then be performed in the filtering data base maintained in RAM 111, to match the DA with SA's stored therein. If a match is detected, the message in buffer 107 is discarded, as the message is intended for a station 100 on medium 101. If no match is found, the message is further processed, if necessary, and then passed to medium 116 via a second network interface controller 113 and port 114. Note that messages originating on medium 116 are received in bridge 120 via port 114 and network interface controller 113, and are processed in a manner identical to that described above. Thus, it will be seen that the bridge is bidirectional in its operation.

From the above description, it is seen that all messages are received in buffer memory 117 and processed by CPU 109, whether or not they are destined for a station connected to transmission medium 101 or elsewhere. This is inefficient and unacceptable in the context of high speed networks.

Figure 2:
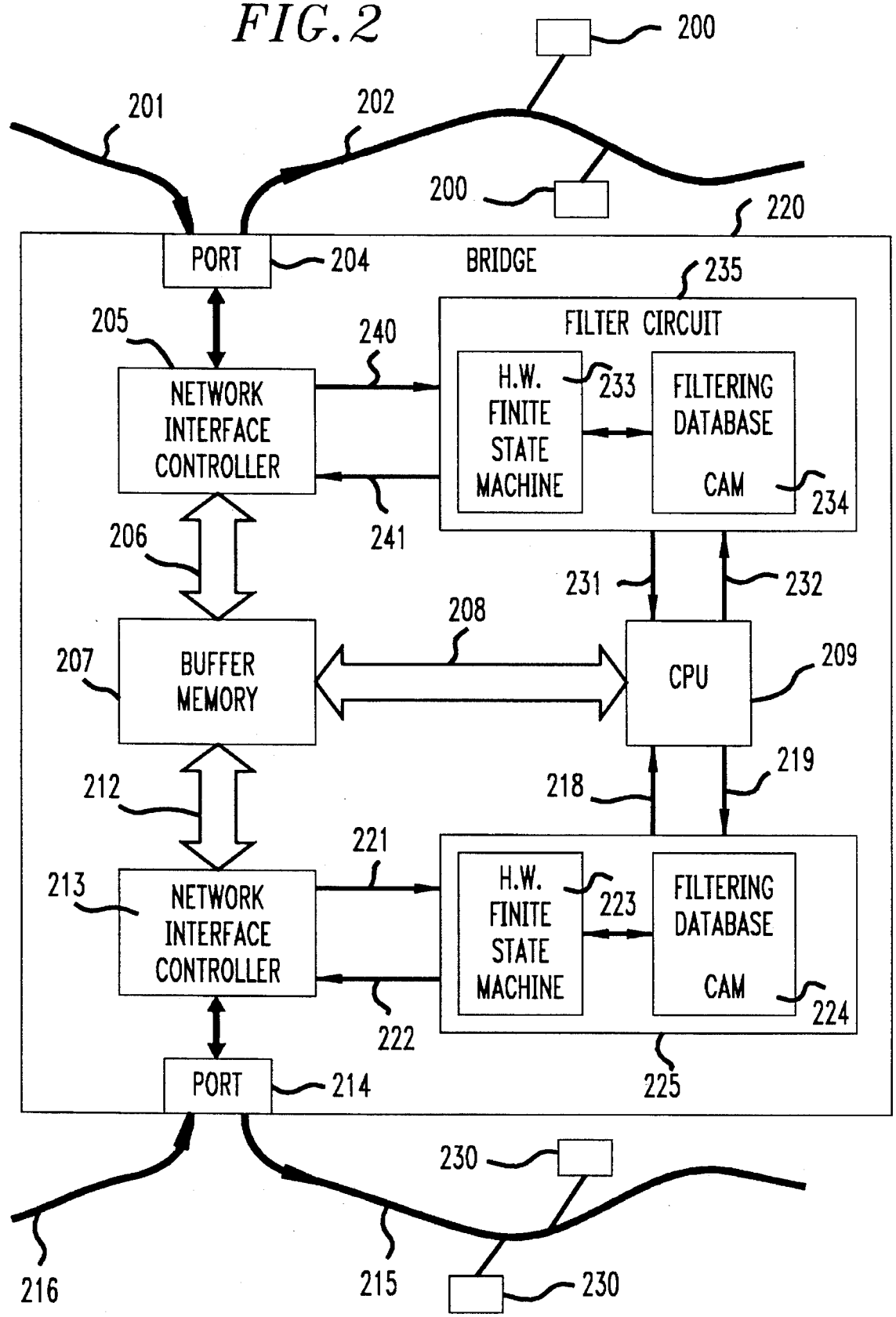
FIG. 2 is an overall block diagram illustrating a FDDI bridge which incorporates a filtering and learning arrangement in accordance with the present invention.

In accordance with the present invention, as shown generally in block diagram form in FIG. 2, bridge 220 includes a filter 235 which in turn comprises a hardware finite state machine 233 interconnected with a content addressable memory (CAM) 234. Filter 235 acts as a preprocessor with respect to messages received in bridge 220 from the incoming leg 201 of a transmission medium port circuit 204. In this embodiment, the transmission medium may be an optical fiber supporting FDDI communication protocol, which interconnects a first network of stations 200. More specifically, before a message is applied to buffer memory 207 for processing, the DA and SA information in the message is passed to filter 235 via link 240. As finite state machine 233 proceeds through its operating sequence (as explained more fully below), the DA is checked with the data base in CAM 234 to determine whether the message should be further processed or dropped. This database includes the SA's of stations on the first network, which is dynamically updated as discussed more fully below. If the message is not destined for a station 200, it is entered in buffer memory 207 via path 206, where further processing may (if necessary) be effected under the control of CPU 209 via control signals received on path 208. This is done so that the message can be passed to a second network of stations 230 interconnected by transmission medium 215, 216, which likewise supports the FDDI protocol. Conversely, if the message is destined for a station on the first network, then the message is not applied to buffer memory 207 and not further processed. Rather, it is repeated and passed back through port circuit 204 and onto the outgoing leg 202 of the transmission medium. (According to the FDDI protocol, all messages except those originating in a particular port, are repeated and passed out of that port.) CPU 209 provides additional control signals to filter 235 via link 232, while control signals in the reverse direction are carried on link 231. The functions provided by CPU 209 are largely "administrative". Examples of the functions performed are (a) control of the "aging process" by which SA's for inactive stations are periodically removed from the CAM; and (b) compilation of statistics related to the stations 200, 230 on the network (e.g., which stations are active, volume of activity, etc.).

In order to make bridge 220 bidirectional, a second filter 225 comprising finite state machine 223 and CAM 224 may be provided. Filter 225 preprocesses messages received from the incoming leg 216 of the second transmission medium via port 214 via network interface controller 213, and applies only those messages destined for stations 200 on the first network interconnected by transmission medium 201, 202 to buffer memory 207 for additional processing. Here again, bridge 220 is thus arranged symmetrically for processing of bidirectional traffic.

Figure 3:
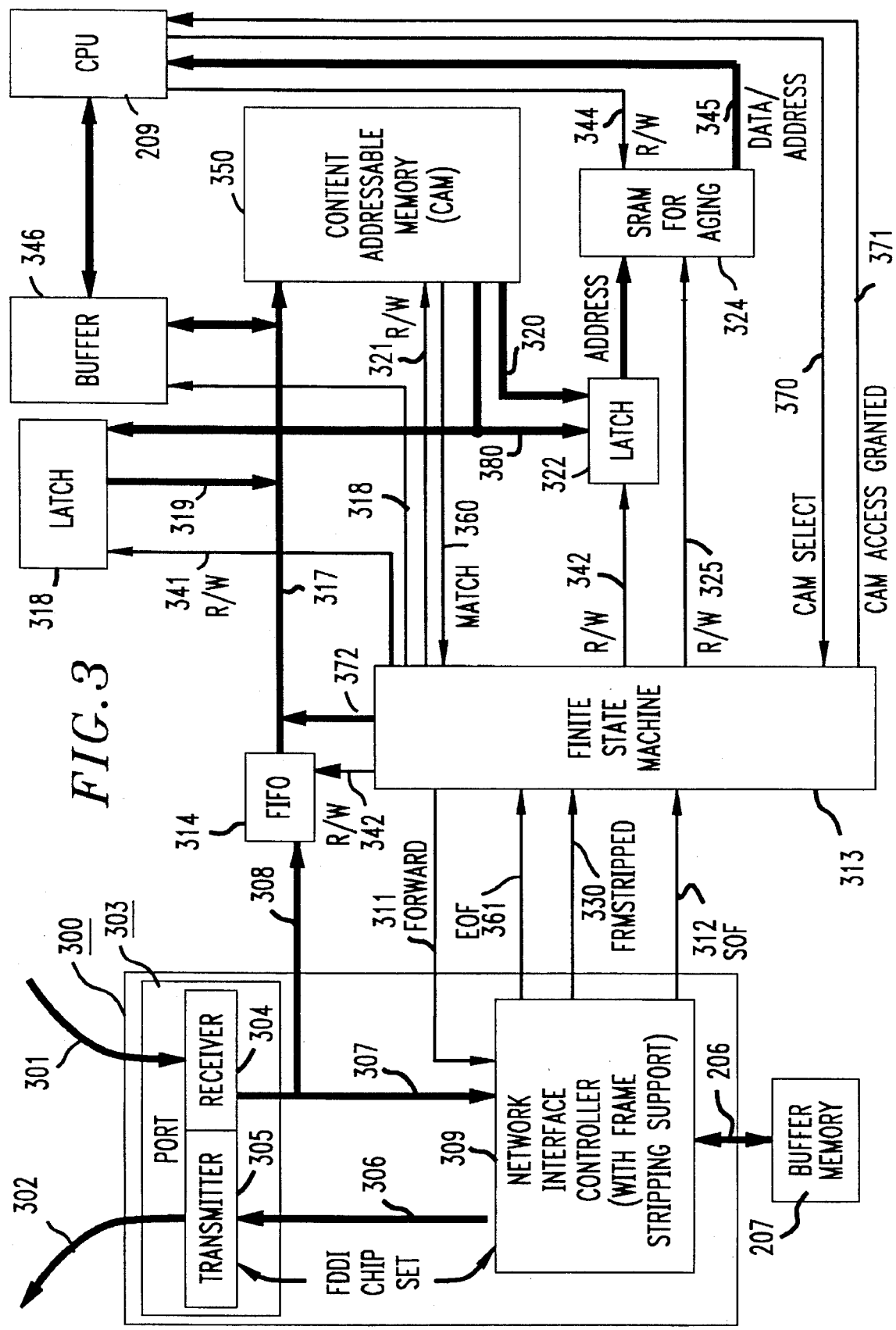
FIG. 3 is a more detailed circuit diagram of the bridge 220 in FIG. 2.

FIG. 3 is a more detailed circuit diagram illustrating the arrangement of filter circuits 235 (and 225) of FIG. 2 and its relationship with other portions of bridge 220. The apparatus of FIG. 3 includes an FDDI chip set 300 which performs the functions of port circuit 204 and network interface controller 205 of FIG. 2. More specifically, port 303 includes a receiver 304 which provides the connection between the incoming leg 301 of the transmission medium and the bridge, and transmitter 305, which provides the connection between the bridge and outgoing leg 302. Port 303 performs certain FDDI physical layer functions on the data received from and applied to the transmission medium, as is well known. These functions include optical/electrical conversion, for example. Network interface controller 309 receives its input from receiver 304 via link 307, and provides outgoing information to transmitter 305 via link 306. Several commercially available integrated circuits, such as models 7984, 7985, and 79C81-83 supplied by AMD may provide the functionality of FDDI chip set 300.

Figure 4:
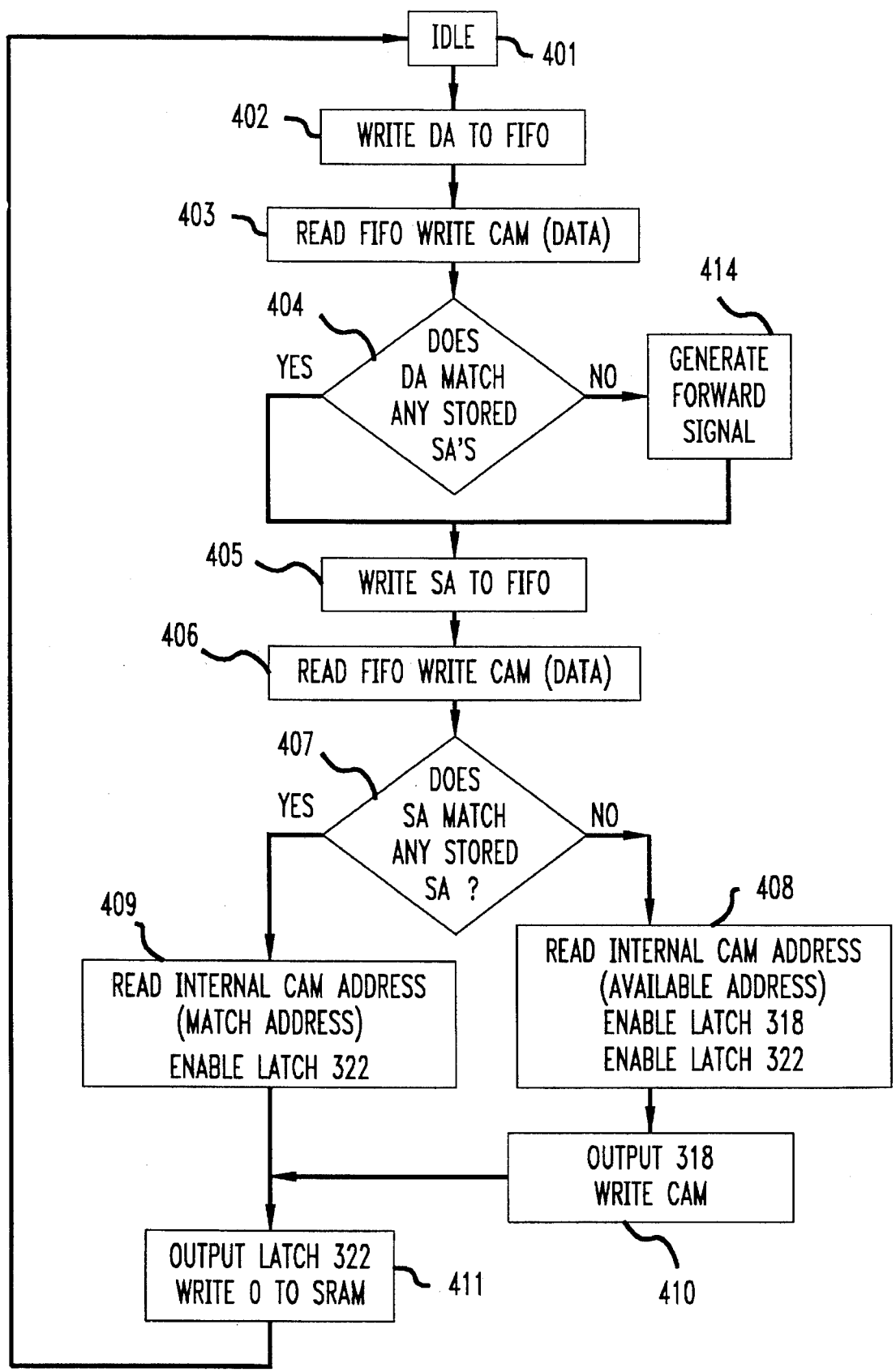
FIG. 4 is a logic flow diagram for finite state machine 313 of FIG. 3.

Operation of the bridge of FIG. 3 will be further described in conjunction with the flow diagram of FIG. 4. Finite state machine 313, which may be implemented with programmable logic sequencers, such as model 22V10 available from AMD, is arranged to constantly monitor the status of network interface controller 309, via inputs on lines 312, 330 and 361 and to step through a sequence of logical states, illustrated in FIG. 4, when each message is received in the bridge. When a start of frame delimiter is detected in an incoming frame by network interface controller 309, finite state machine 313 receives an SOF input on line 312 and starts the filtering process by a transition from its idle state 401 to state 402 in which it signals FIFO (first in, first out) register 314 on line 342 to begin reading the destination address (DA) of the message. In order to save time, as the current portion of the DA is being read into FIFO 314, the previously stored portion of the DA can be written to the comparand register of content addressable memory (CAM) 350, in state 403. The details of CAM 350 are described more fully below. This process of collecting the DA and applying it to CAM 350 can continue for several iterations as necessary, until the entire destination address is contained in the comparand register.

In state 404, finite state machine 313 receives the results of a comparison performed by CAM 350 between the data existing in the CAM, representing the SA's of stations connected to the transmission medium from which the message was received, and the DA just written into the comparand register. If the outcome of the comparison is negative, (i.e. there is no match), CAM 350 (in state 414) signals FSM 313 via a "match status" signal on line 360, and FSM 313 in turn signals network interface controller 309 via a "forward" signal on line 311, to copy the incoming frame into buffer memory 207 for further processing. Eventually, this message will be applied to the second network to which the bridge is connected. On the other hand, if there is a match, FSM 313 continues directly to state 405 without copying the message. Thus, the message is intended for and will be made available only to other stations on the first network.

In state 405, a data collection procedure is followed in FSM 313 with respect to the SA contained in the message, wherein the current portion of the SA is captured and written into FIFO 314. Next, in state 406, the previously stored SA is written to the comparand register of CAM 350, while the present portion is again read. A comparison between the SA contained in the comparand register and the stored data in the CAM occurs in state 407, indicating whether the SA already exists in the CAM, or if it should be added into the CAM. If a match occurs, FSM 313 is signaled by a "match" signal on line 360, and proceeds to state 409, where it reads the internal address of the CAM at which a matched value exists, and latches (stores) the address in latch 322 via an output on line 320. If the SA does not match any stored SA, FSM 313 proceeds to state 408, where it reads out on line 340, the first available location in CAM 350 where the SA can be stored. This internal address is latched (stored) in both latches 318 and 322. The react/write operations in latches 318 and 322 are controlled by outputs from finite state machine 313 on lines 341 and 342, respectively. FSM 313 stays at state 408 or 409 until network interface controller 309 signals FSM 313 on line 361 that an ending delimiter (EOF) has been detected in the message. At this point, FSM 313 transitions to state 410 or 411. If a new SA is to be stored in CAM 350, when state 410 is reached, a read command is applied to latch 318 on line 341, so that latch 318 outputs the latched internal address on line 319. Concurrently, control command is issued by FSM 313 to CAM 350 on line 372, to move the SA from the comparand register of the CAM into the CAM array at the address supplied by latch 318.

After either state 409 and 410, finite state machine 313 proceeds to state 411, in which the internal address stored in latch 322 is used to update a table maintained in SRAM 324, so that the activity in each station on the network can be monitored.

SRAM 324 is advantageously arranged to be dual ported, and arranged so that it contains the same number of entries as CAM 350, and so that every address recorded in CAM 350 has a corresponding entry in SRAM 324, at the same location. In order to record the "age" of each SA, the bridge of FIG. 3 is arranged so that whenever a SA is encountered, the entry in SRAM 324 associated with that SA is cleared (reset to zero), using the first SRAM port, indicating that the SA is current. CPU 209 periodically increments all entries in SRAM 324, using the second SRAM port and data/address line 345. As a result, the value of an entry is directly related to the time since the SA was last encountered. CPU 209, based on the age of each SA, also controls removal of aged SA's in CAM 350 and the corresponding aging information in SRAM 324. This is done by first periodically reading and comparing stored values in SRAM 324 to a threshold, using the read/write control line 344 to apply stored data on line 345 to CPU 209. When an aged SA is encountered, the internal address is passed to CPU 209 via line 345. The stale SA may then be removed when a remove command is issued to CAM 350 by CPU 209.

It is to be noted that CPU 209 does not participate directly in the filtering process—it simply assists in keeping track of "aging" SA's. Thus, the bridge arrangement of the present invention can operate much more efficiently than other apparatus presently available.

While the sequence of steps illustrated in FIG. 4 indicate that the read and write operations in FIFO 314 occur at different time intervals than read and write operations within CAM 350, it should be understood that it is sometimes necessary to arrange FIFO 314 to read and write concurrently at different rates, and that CAM 350 can thus process addresses simultaneously with the input and output of other addresses in FIFO 314. Referring again to FIG. 4, it is to be noted that finite state machine 313 is arranged to return to idle state 401 after the aging information in SRAM 324 has been updated in state 411. Not shown in FIG. 4 is the fact that the process followed in finite state machine 313 may be prematurely terminated at any time, if an anomalous condition is determined to exist. In this event, FSM returns directly to idle state 401 from whatever state it is presently in. For example: if the bridge encounters a frame with a format different from the expected format or not supported by the bridge, it will return to state 401. Also, FSM 313 is arranged to return directly to state 402 if, at any time, an SOF signal is detected on line 312. This is done because it is common to encounter packet remnants on the transmission medium. If an SOF signal does occur before the entire process of FIG. 4 is completed, then the packet just processed was in fact a remnant, so that the next packet should then be timely processed.

Network interface controller 309 is arranged to provide a FRMSTRIPPED signal to FSM 313 via line 330. When this signal is present, then depending on implementation, it indicates, for example, that the packet originated from the bridge of FIG. 3 itself, rather than from an external station, and therefore the FSM 313 suspends its operation on the current message, and discards the frame without "learning" its SA.

CAM 350 may be implemented using content addressable memory model 99C10 available from AMD. This circuit is organized internally as a 256×48 bit device, with a 16 bit external I/O bus. A data write moves data from I/O bus 317 into the Comparand Register; a 48 bit write is achieved through three consecutive 16 bit writes. A comparison of the data in the comparand register and in the CAM array occurs automatically after a data write is completed, and an active match status signal on line 360 occurs if there is a match. After a comparison operation, the status will also indicate at which location a match occurred, or if no match occurred, which location is available for storage of new data. Other operations are performed in the CAM through combination of signals applied to bus 317 and line 321. For example, a "move" command applied on bus 317 is used to move the 48 bit data from the comparand register to the CAM array where the data is stored. An "empty" command on line 321 is used to empty a location in the CAM array, the address of which is provided on bus 317.

It is to be noted here that although FIG. 3 shows outputs from CAM 350 on lines 320 and 340 for the purpose of supplying internal addresses to latches 318 and 322, if the CAM is implemented using the above identified device from AMD, then this information is available instead on bus 317.

Access of CPU 209 to CAM 350 is arbitrated through finite state machine 313; access is granted only when finite state machine 313 is in a standby state. This is accomplished under the control of CPU 209, which extends a CAM SELECT signal to FSM 313 on line 370 when access is desired. If permission is granted, a signal is returned to CPU 209 on line 371. Under these conditions, CPU 209 then enables a local buffer 346 to read and write data from bus 317 at appropriate intervals, so that information may be timely presented at the data input to CAM 350. Buffer 346 also obtains an input from FSM 313 on line 318, indicating that CAM 350 is enabled to be accessed by CPU 209.

In accordance with the present invention, FSM 313 preprocesses messages to determine which ones need to be applied to buffer memory 207, while others are blocked. This frees up CPU 209, and enables the bridge to operate at the high speeds required in FDDI apparatus.

Various modifications and adaptations of the present invention will be readily apparent to those skilled in the art. For example, different operating sequences can be used in finite state machine 313 with good results. Also, other arrangements can be used to remove stale SA's from CAM 350. Accordingly, it is intended that the invention be limited only by the following claims:

I claim:

1. Apparatus for filtering messages on a first data network interconnecting a first plurality of stations, to identify those messages intended for stations on a second data network, each of said messages including a source address (SA) and a destination address (DA), said apparatus comprising means including a content addressable memory (CAM) for storing the SA's for stations on said first data network;

means including a finite state machine for comparing the DA of each message with said stored SA's by applying each DA to an input of said CAM; and means for generating a "no-match" signal in said CAM to identify messages having DA's that are different from any stored SA.

2. The invention defined in claim 1 wherein said CAM includes:

a data input, a data output, and a control output, and a plurality of storage locations for SA's, each of said locations having an address, and wherein said CAM is arranged to output a match signal on said control output if said data input matches any stored data in said CAM, to output said "no-match" signal on said control output if said input does not match any stored data in said CAM, and to output the address of the storage location of said stored data in response to said match signal.

3. A bridge interconnecting first and second FDDI networks, said bridge arranged to process messages present on said first network destined either for one or more stations connected to said first network, or for one or more stations connected to said second network, each of said messages including a source address (SA) and a destination address (DA), said bridge comprising means including a content addressable memory (CAM) for storing the SA of stations connected to said first network;

means for extracting the DA from each of said messages and comparing said DA with SA's stored in said CAM; and means responsive to a control output of said CAM which produces a match signal only if said DA matches any SA stored in said CAM for further processing only those messages with DA's that do not match any of said stored SA's.

4. The invention defined in claim 3, further including means for storing information indicative of the activity of stations on said first network, and means for removing from said CAM the SA associated with inactive stations.

5. The invention defined in claim 3 wherein said extracting means includes a finite state machine.

6. Apparatus forming a bridge between first and second data networks, each of said networks comprising of plurality of interconnected stations each having an address, each of said messages including a source address (SA) and a destination address (DA), said apparatus comprising first means arranged to store SA's of stations connected to said first network;

second means arranged to match the DA of each message with said stored SA's; and third means arranged to forward a message from said first network to said second network only if said DA does not match any of said stored SA's, wherein said first means includes a content addressable memory arranged to output a match signal if said DA matches any of said stored SA's, and wherein said second means includes a finite state machine arranged to control said third means in response to said match signal.

7. The invention defined in claim 6, wherein said apparatus further includes fourth means for storing information associating, with each SA, the time interval since the last receipt of a messages from the associated station; and fifth means responsive to said fourth means for removing from said first means any SA if its time interval exceeds a predefined threshold.

8. Apparatus for filtering messages applied to a FDDI bridge by stations on a local network in order to select messages intended for stations in foreign networks, each of said messages including indicia associated with an originating station and a destination station, said apparatus comprising means for compiling a data base of the indicia associated with originating stations on said local network;

for each message, means for searching said data base to determine if it includes indicia associated with the destination station for such message; and means for applying ones of said messages to a foreign network in response to the output of said searching means, wherein said compiling means includes a content addressable memory arranged to generate a control signal for controlling said applying means in accordance with the presence or absence of indicia in said CAM.

9. The invention defined in claim 8 wherein said searching means includes a finite state machine.

10. In apparatus for filtering messages originating in a first network of interconnected stations to extract messages destined for stations on a second network, each of said messages including a source address and a destination address, said apparatus including means for storing the source addresses of stations on said first network;

means for comparing destination addresses of each message to determine if it matches any of said stored source addresses; and means responsive to said comparing means for selecting for further processing messages in which said destination address does not match said source address;

the improvement comprising means for preprocessing said messages by performing said comparing step in a CAM before further processing of said selected messages, said CAM arranged to output a match signal if said DA matches any of said stored SA's.

11. The invention defined in claim 10 wherein said storing means includes a content addressable memory.

12. The invention defined in claim 10 wherein said comparing means includes a finite state machine.

13. Bridge apparatus for processing messages on a first network of interconnected communications stations to extract those messages destined for stations on a second network of interconnected communications stations, each of said stations having an address, each of said messages having a header containing the address of the destination station (DA) and the address of the source station (SA), and a data portion, said bridge apparatus comprising means for preprocessing said header information of a message originating in a station on said first network by comparing the DA of said message with the SA's of all of said stations on said first network to determine if said message is destined for one of said stations on said second network or another one of said stations on said first network, said preprocessing means including a CAM arranged to output a match signal if said DA matches any of said stored SA's, and means for further processing said data portion only if said message is destined for said one of said stations on said second network.

14. A method of filtering messages on a first data network interconnecting a first plurality of stations, to identify those messages intended for stations on a second data network, each of said messages including a source address (SA) and a destination address (DA), said method comprising the steps of storing the SA's for stations on said first data network in a content addressable memory (CAM);

comparing the DA of each message with said stored SA's by applying each DA to an input of said CAM to generate a signal indicating a match between said DA and the contents of said CAM; and identifying messages having DA's that are different from any stored SA.

15. The invention defined in claim 14 wherein said content addressable memory includes a data input, a data output, and a control output, and a plurality of storage locations for SA's, each of said locations having an address, and wherein said comparing step includes outputting a match signal on said control output if said data input matches any stored data in said CAM, and outputting the address of the storage location of said match or the address of an empty storage location if there is no match.

16. In a bridge interconnecting first and second FDDI networks, a method of processing messages present on said first network destined either for one or more stations connected to said first network, or for one or more stations connected to said second network, each of said messages including a source address (SA) and a destination address (DA), said processing method including the steps of storing the SA of stations connected to said first network in a content addressable memory (CAM);

extracting the DA from each of said messages and comparing said DA with SA's stored in said CAM; and responsive to a control output of said CAM which produces a match signal only if said DA matches any SA stored in said CAM, further processing only those messages with DA's that do not match any of said stored SA's.

17. The method defined in claim 16 further including the steps of storing information indicative of the activity of stations on said first network, and removing from said CAM the SA associated with inactive stations.

18. A method of processing messages in a bridge formed between first and second data networks, each of said networks comprising of plurality of interconnected stations each having an address, each of said messages including a source address (SA) and a destination address (DA), said method comprising the steps of storing SA's of stations connected to said first network;

matching the DA of each message with said stored SA's; and forwarding a message from said first network to said second network only if said DA does not match any of said stored SA's, wherein said storing step includes storing said SA's in a content addressable memory arranged to output a match signal if said DA matches any of said stored SA's, and wherein said matching step is performed under the control of a finite state machine.

19. The invention defined in claim 18, wherein said method further includes storing information associating, with each SA, the time interval since the last receipt of a messages from the associated station; and removing from storing means any SA if its time interval exceeds a predefined threshold.

20. A method of filtering messages applied to a FDDI bridge by stations on a local network in order to select messages intended for stations in foreign networks, each of said messages including indicia associated with an originating station and a destination station, said method comprising compiling a data base of the indicia associated with originating stations on said local network;

for each message, searching said data base to determine if it includes indicia associated with the destination station for such message; and applying ones of said messages to a foreign network in response to the output of said searching step, wherein said compiling step includes storing said indicia in a content addressable memory arranged to generate a control signal for controlling said applying step in accordance with the presence or absence of indicia in said CAM.

21. The method defined in claim 20 wherein said searching step includes processing said indicia under the control of a finite state machine.

22. In a method of filtering messages originating in a first network of interconnected stations to extract messages destined for stations on a second network, each of said messages including a source address and a destination address, said method including storing the source addresses of stations on said first network;

comparing destination addresses of each message to determine if it matches any of said stored source addresses; and selecting messages for further processing in response to said comparing step, only messages in which said destination address does not match said source address;

the improvement comprising preprocessing said messages by performing said comparing step in a CAM before further processing of said selected messages, said CAM arranged to output a match signal if said DA matches any of said stored SA's.

23. The method defined in claim 22 wherein said storing step includes storing said SA's in a content addressable memory.

24. The method defined in claim 23 wherein said comparing step includes processing said SA's in a finite state machine.

25. A method of processing messages on a first network of interconnected communications stations to extract those messages destined for stations on a second network of interconnected communications stations, each of said stations having an address, each of said messages having a header containing the address of the destination station (DA) and the address of the source station (SA), and a data portion, said method comprising preprocessing said header information of a message originating in a station on said first network by comparing the DA of said message with the SA's of all of said stations on said first network to determine if said message is destined for one of said stations on said second network or another one of said stations on said first network, said preprocessing step including a CAM arranged to output a match signal if said DA matches any of said stored SA's, and further processing said data portion only if said message is destined for said one of said stations on said second network.

* * * * *